United States Patent [19]
Matsumoto et al.

[11] Patent Number: 5,986,423
[45] Date of Patent: Nov. 16, 1999

[54] INDUSTRIAL ROBOT

[75] Inventors: Kazunori Matsumoto, Ibaraki; Yasushi Mukai, Osaka; Seiji Iwai, Kawanishi, all of Japan

[73] Assignee: Matsushita Electric Industrial Co., Ltd., Osaka, Japan

[21] Appl. No.: 08/878,846

[22] Filed: Jun. 19, 1997

[30] Foreign Application Priority Data

Jun. 20, 1996 [JP] Japan ................................ 8-159372

[51] Int. Cl.⁶ .................................................. B25J 19/02
[52] U.S. Cl. ........................... 318/568.16; 901/9; 901/23
[58] Field of Search ........................... 901/1–13, 19–26, 901/27, 30–50; 318/560, 567, 568.1–568.25

[56] References Cited

U.S. PATENT DOCUMENTS

| | | | |
|---|---|---|---|
| 4,591,944 | 5/1986 | Gravel | 901/33 |
| 4,906,907 | 3/1990 | Tsuchihashi et al. | 318/568.22 |
| 4,928,047 | 5/1990 | Arai et al. | 318/568.16 |
| 5,266,875 | 11/1993 | Slotine et al. | 318/568.16 |
| 5,378,968 | 1/1995 | Ezawa et al. | 318/568.16 |

FOREIGN PATENT DOCUMENTS 7-181058  7/1995  Japan .

*Primary Examiner*—David Martin
*Attorney, Agent, or Firm*—Wenderoth, Lind & Ponack, L.L.P.

[57] ABSTRACT

An industrial robot includes a manipulator, a sensor which is provided on the manipulator, and a power source for supplying electric power to the sensor. A reference potential point is provided between the sensor and the power source.

12 Claims, 4 Drawing Sheets

INDUSTRIAL ROBOT

BACKGROUND OF THE INVENTION

The present invention relates to an industrial robot in which a power source for sensors is incorporated.

In recent industrial robots, a controller and a manipulator are provided separately from each other in most cases. Meanwhile, the controller is provided with sensors for feeding back to the controller signals on position and angle or velocity of the manipulator.

Generally, a conventional industrial robot of this kind has such an arrangement as shown in FIGS. 4 and 5. The known industrial robot includes a controller 1, a manipulator 2, sensors 4 mounted on motors 3 of the manipulators 2, respectively and a cable 5 for transmitting feedback signals of the sensors 4 to the controller 1.

In the known industrial robot of the above described arrangement, a power source 6 for supplying electric power to the sensors 4 is incorporated in the controller 1.

Meanwhile, after the power source 6 has been turned off, a battery for effecting backup of current position of the manipulator 2 is required to be connected to the sensors 4. Furthermore, a function of resetting backup values of the manipulator 2 may be furnished for maintenance purposes. When the backup values of the manipulator 2 are reset, resetting cables of the sensors 4 are usually short-circuited to a power cable.

In this prior art industrial robot in which the power source 6 for the sensors 4 is incorporated in the controller 1, length of the cable 5 for connecting the controller 1 and the manipulator 2 is limited. Namely, potential difference is produced between the power source 6 and the motors 3 by product of electric current flowing through the cable 5 to the sensors 4 and resistance of the cable 5 and may lead to a risk that the feedback signals from the sensors 4 are erroneously received by the controller 1.

Furthermore, since the cable 5 is exposed outwardly, noise may penetrate into the cable 5 in an environment having much noise, in which the industrial robot is installed, and there is a risk that accurate detection cannot be performed by the sensors 4. Therefore, in order to obviate this risk, a noise quieting filter has been required to be provided.

Meanwhile, even if the power source 6 for the sensors 4 are provided on the manipulator 2 in the known industrial robot, the power source 6 is caused to branch to the motors 3 of respective axes of the manipulator 2 and thus, the above mentioned problems of potential difference between the power source 6 and the motors 3 and noise cannot be solved. Furthermore, in this case, since the power source 6 is caused to branch to the motors 3 of the manipulator 2, an inconvenience is also incurred since branch portions 7 of the cable become complicated.

In addition, in case the earlier mentioned resetting cables for resetting the backup values of the manipulator 2 are provided for maintenance of the sensors 4, a phenomenon associated with the resetting cables may happen as follows. Since the backup values of the manipulator 2 are erroneously reset due to noise referred to above, the resetting cables should be shortened and thus, each resetting cable is required to be terminated at a connector 8 provided on the manipulator 2 as shown in FIG. 4. Therefore, since each resetting cable is confined to a short interval between the sensor 4 and the connector 8, it is difficult to perform an operation for resetting the backup values of the manipulator 2 at the time of maintenance of the sensors 4.

SUMMARY OF THE INVENTION

Accordingly, an essential object of the present invention is to provide, with a view to eliminating the above mentioned disadvantages of the prior art, an industrial robot in which a cable for connecting a controller and a manipulator can be lengthened and which can be installed in an environment which is severe due to noise.

Another object of the present invention is to provide an industrial robot in which cables are simplified structurally and resetting of backup values of a manipulator is facilitated.

In order to accomplish these objects of the present invention, an industrial robot according to the present invention comprises: a manipulator; a sensor which is provided on the manipulator; and a power source for supplying electric power to the sensor; wherein a reference potential point is provided between the sensor and the power source.

Meanwhile, in the present invention, a reference potential line is provided on a cable. The cable is operable for supplying electric power to the power source from a controller. The controller is operable for controlling the manipulator. Further, the reference potential line is connected to the reference potential point.

Furthermore, in the present invention, a plurality of power sources each having a filter and a switch mounted on a printed circuit board are provided adjacent to a plurality of sensors, respectively.

In accordance with the present invention, since the reference potential point is provided, a potential difference due to electric resistance of the cable can be eliminated and thus, the cable between the controller and the manipulator can be lengthened.

Meanwhile, since the branch portion of the power source for the sensor is formed by the printed circuit board, cables are simplified structurally. If the printed circuit board is provided adjacent to the sensor, the filter can be disposed adjacent to the sensor. Therefore, it is possible to prevent malfunction of the industrial robot even in an environment which is severe due to noise. Furthermore, backup values of the manipulator can be reset easily by a switch provided on the printed circuit board.

BRIEF DESCRIPTION OF THE DRAWINGS

These objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
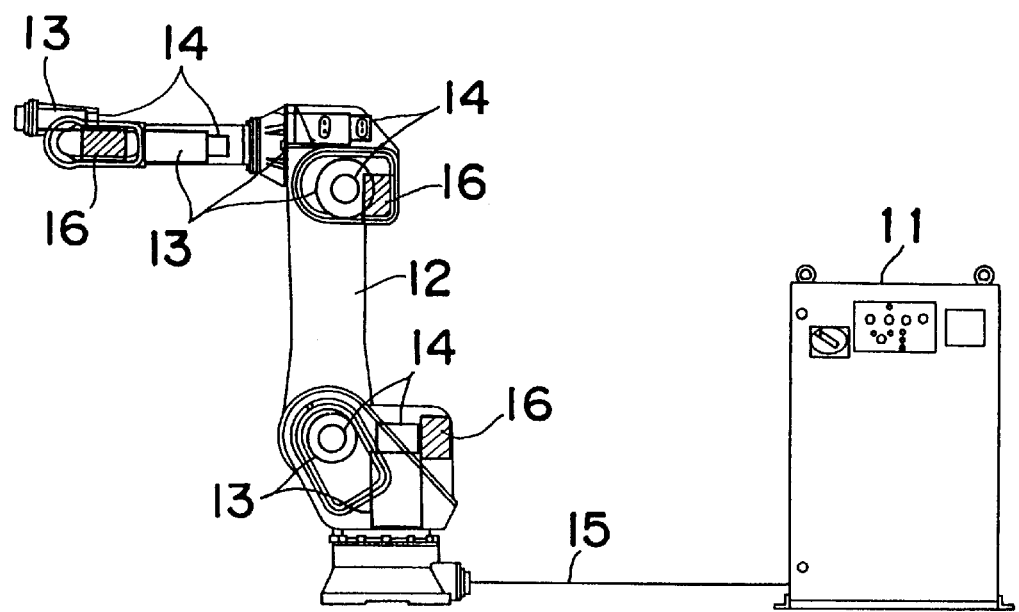
FIG. 1 is a schematic view of an industrial robot according to one embodiment of the present invention.
Figure 2:
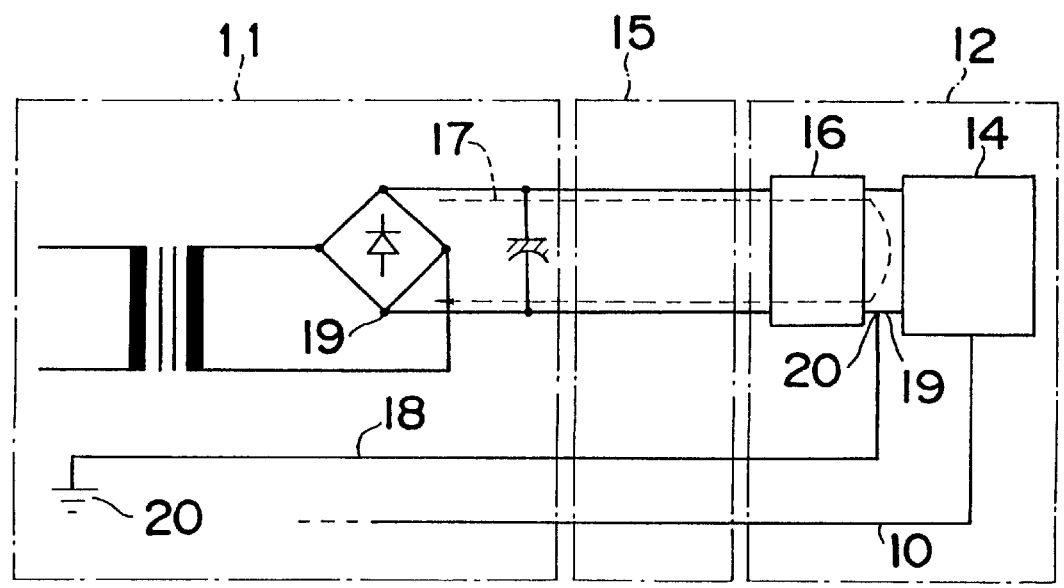
FIG. 2 is a circuit diagram of the industrial robot of FIG. 1.

Hereinafter, an industrial robot according to one embodiment of the present invention is described with reference to FIGS. 1 to 3. As shown in FIGS. 1 and 2, the industrial robot includes a controller 11, a manipulator 12, a plurality of sensors 14, mounted on motors 13, for detecting position and angle or velocity of motors 13 of the manipulator 12, respectively, a cable 15 for transmitting feedback signals from the sensors 14 to the controller 11, and power sources 16 for supplying electric power to the sensors 14, respectively.

Figure 3:
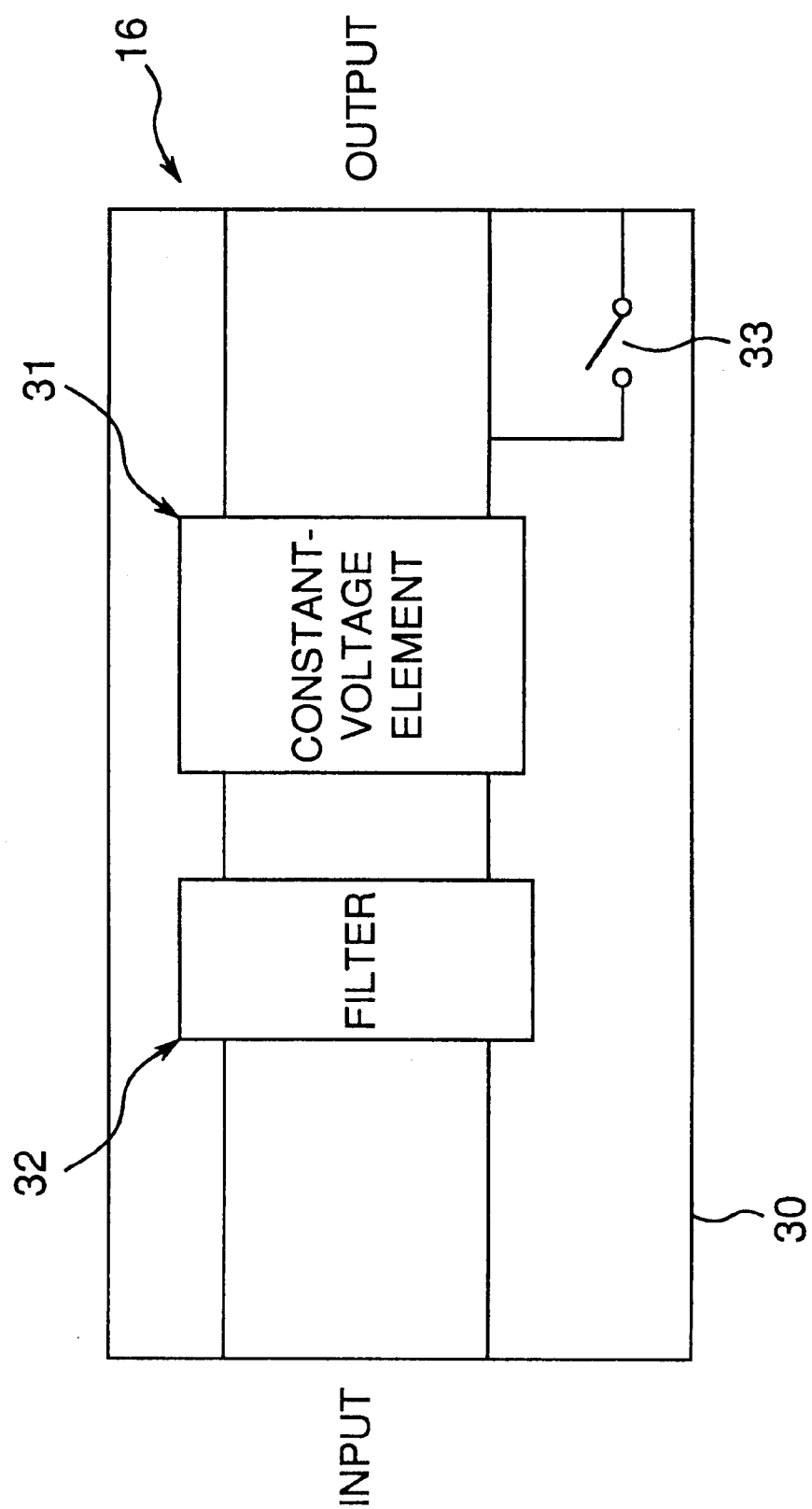
FIG. 3 is a circuit diagram of a power source for a sensor of the industrial robot of FIG. 1.
Figure 4:
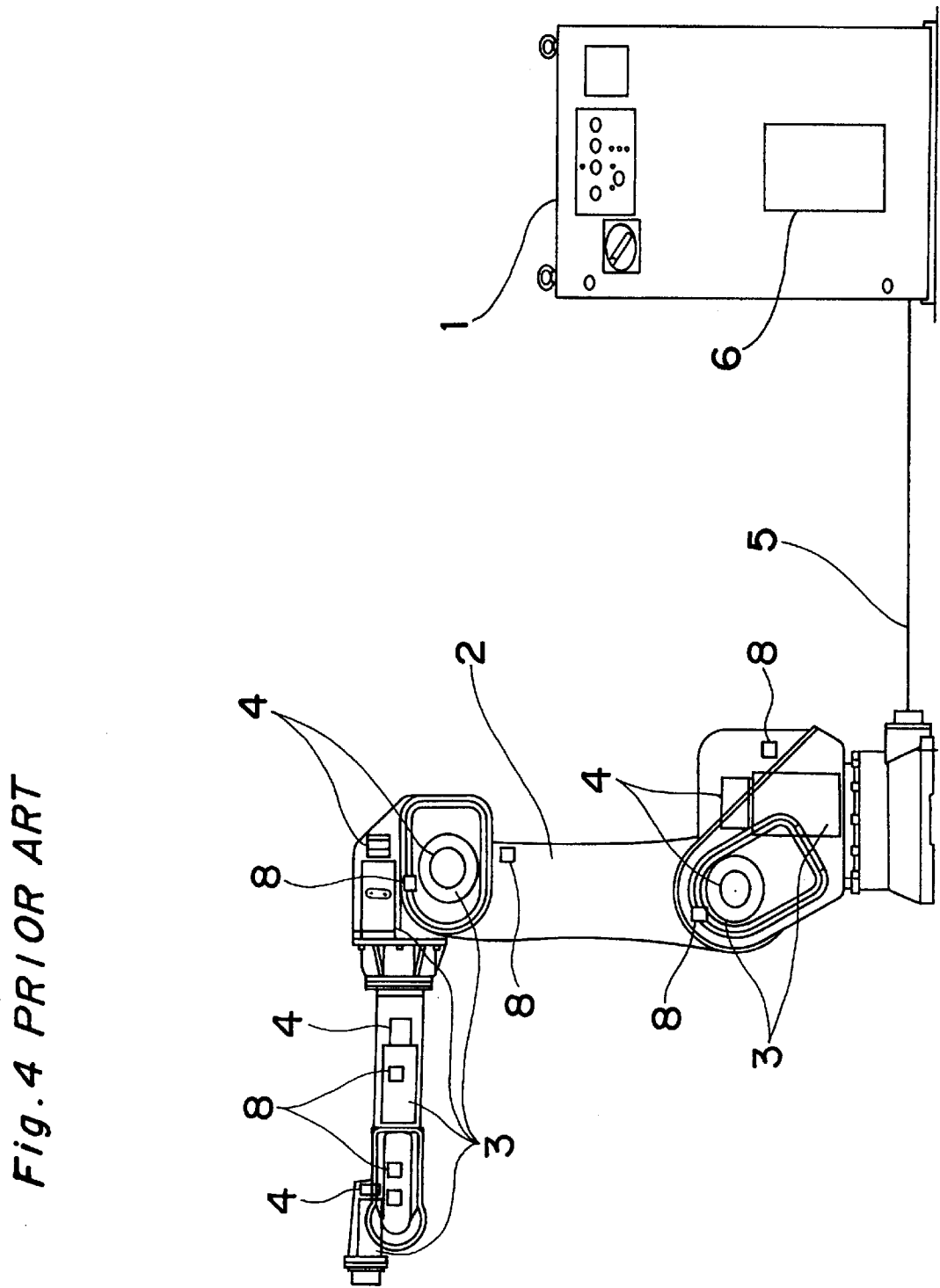
FIG. 4 is a schematic view of a prior art industrial robot (already referred)
Figure 5:
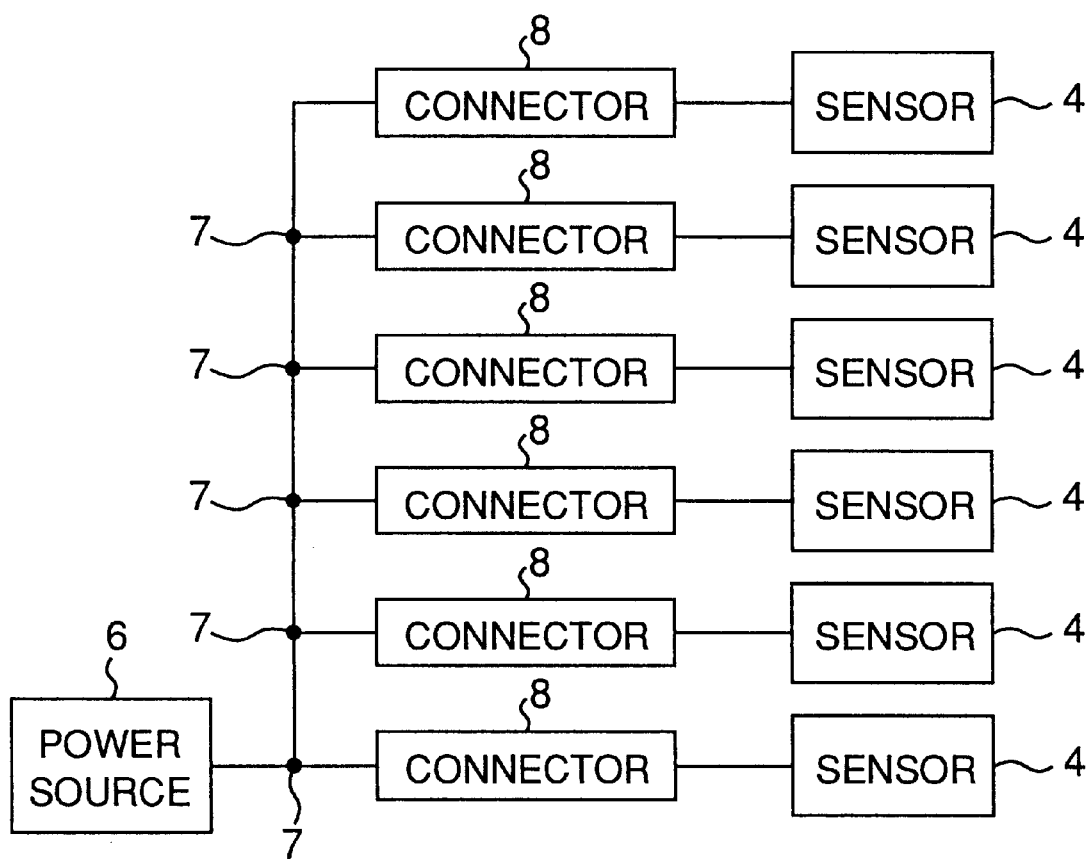
FIG. 5 is a wiring diagram of the prior art industrial robot of FIG. 4 (already referred to).

Meanwhile, as shown in FIG. 3, each of the power sources 16 is formed by a printed circuit board 30 and includes a constant-voltage element 31 acting as a power source for the sensors 14, in which input voltage has a predetermined range and output voltage is constant, a filter 32 for eliminating noise up to an input of the power source 16 and a switch 33 for resetting backup values of the manipulator 12. Furthermore, the printed circuit boards 30 acting as the power sources 16 are, respectively, disposed adjacent to the sensors 14.

In case a plurality of, for example, two sensors 14 are provided adjacent to each other as shown in FIG. 1, one power source 16 may branch off to the two sensors 14 by the printed circuit board 30, so that one power source 16 can be used for the two sensors 14 and thus, a cable between the power source 16 and the sensor 14 can be simplified structurally.

Meanwhile, since a cable for resetting backup values of the manipulator 12 is connected to the printed circuit board 30 referred to above, the backup values of the manipulator 12 can be reset easily by merely operating the switch 33. Since the printed circuit boards 30 are disposed adjacent to the sensors 14, there is no risk that the backup values of the manipulator 12 will be erroneously reset due to noise.

Furthermore, since the printed circuit boards 30 are disposed adjacent to the sensors 14 and noise immediately prior to input to the sensors 14 is eliminated by the filter 32 in each of the printed circuit boards 30, the printed circuit boards 30 are not adversely affected by noise in the cable 15 between the controller 11 and the manipulator 12 and in the manipulator 12.

Meanwhile, in a circuit shown in FIG. 2, a reference potential point 20 is provided in addition to a line 17 and is connected to, for example, an earth potential of 0 V by a reference potential line 18. Electric current of the sensor 14 flows through the line 17 and potential difference at a point 19 reaches 0 V. Voltage drop of the cable 15 is proportional to resistance and electric current of the cable 15. However, also in the controller 11 for controlling the motors 13 in response to the sensors 14 and feedback 10 from the sensors 14, a potential difference at the reference potential point 20 reaches 0 V and thus, malfunction of the industrial robot can be prevented. Meanwhile, since up to the range of input voltage of the constant-voltage element 31 of the power source 16 is permissible for absolute value of the voltage drop, the cable 15 can be lengthened.

As is clear from the foregoing description of the present invention, the cable for connecting the controller and the manipulator can be lengthened, the industrial robot can be installed in an environment which is severe due to noise, the cables can be simplified structurally and the backup values of the manipulator can be reset easily. Therefore, in accordance with the present invention, the degree of freedom for installing the industrial robot and its motors is increased and maintenance properties of the industrial robot are excellent.

What is claimed is:

1. An industrial robot comprising:
    a manipulator;
    a sensor provided on said manipulator;
    a power source provided adjacent to and connected to said sensor for supplying electric power to said sensor; and
    a reference potential point provided between said sensor and said power source at a location where said sensor and said power source are connected, wherein said reference potential point has a potential which is fixed at a reference potential value.

2. An industrial robot as claimed in claim 1, further comprising:
    a controller for controlling said manipulator;
    a cable for supplying electric power to said power source from said controller; and
    a reference potential line provided in said cable and connected to said reference potential point and to a potential which is fixed at the reference potential value so as to fix the potential of said reference potential point at the reference potential value.

3. An industrial robot as claimed in claim 2, wherein said reference potential line is connected to ground such that said reference potential point is grounded and the reference potential value is zero.

4. An industrial robot as claimed in claim 2, wherein said reference potential line is operable to prevent the potential of said reference potential point from changing.

5. An industrial robot comprising:
    a manipulator;
    a controller for controlling said manipulator;
    a plurality of sensors provided on said manipulator; and
    a plurality of power sources each provided adjacent to and connected to at least one of said sensors for supplying electric power to said at least one of said sensors, wherein each of said plurality of power sources includes a switch;
    a reference potential point provided between each power source and said at least one of said sensors at a location where said each power source and said at least one of said sensors are connected, wherein said reference potential point has a potential;
    a cable for supplying electric power to said plurality of power sources from said controller; and
    a reference potential line provided in said cable and connected to said reference potential point and to a potential which is fixed at a reference potential value so as to fix the potential of said reference potential point at the reference potential value.

6. An industrial robot as claimed in claim 5, wherein said reference potential line is further connected to ground such that said reference potential point is grounded and the reference potential value is zero.

7. An industrial robot as claimed in claim 5, wherein at least one of said power sources is provided adjacent to and connected to more than one of said plurality of sensors.

8. An industrial robot as claimed in claim 5, wherein said switch is operable for resetting backup values of said manipulator.

9. An industrial robot control system for use with a manipulator and a controller for controlling the manipulator, said industrial robot control system comprising:
    a plurality of sensors to be provided on the manipulator;
    a plurality of power sources each provided adjacent to and connected to at least one of said sensors for supplying electric power to said at least one of said sensors, wherein each of said plurality of power sources includes a switch;

a reference potential point provided between each power source and said at least one of said sensors at a location where said each power source and said at least one of said sensors are connected, wherein said reference potential point has a potential;

a cable for supplying electric power to said plurality of power sources from the controller; and a reference potential line provided in said cable and connected to said reference potential point and to a potential which is fixed at a reference potential value so as to fix the potential of said reference potential point at the reference potential value.

10. An industrial robot as claimed in claim 9, wherein said reference potential line is further connected to ground such that said reference potential point is grounded and the reference potential value is zero.

11. An industrial robot as claimed in claim 9, wherein at least one of said power sources is provided adjacent to and connected to more than one of said plurality of sensors.

12. An industrial robot as claimed in claim 9, wherein said switch is operable for resetting backup values of the manipulator.

\* \* \* \* \*